United States Patent
Ogawa

(10) Patent No.: US 8,944,955 B2
(45) Date of Patent: Feb. 3, 2015

(54) FRICTION GEARING

(75) Inventor: Katsuyoshi Ogawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 414 days.

(21) Appl. No.: 13/148,540

(22) PCT Filed: Feb. 22, 2010

(86) PCT No.: PCT/JP2010/052636
§ 371 (c)(1),
(2), (4) Date: Aug. 9, 2011

(87) PCT Pub. No.: WO2010/103907
PCT Pub. Date: Sep. 16, 2010

(65) Prior Publication Data
US 2012/0004072 A1  Jan. 5, 2012

(30) Foreign Application Priority Data
Mar. 7, 2009  (JP) .................. 2009-054295

(51) Int. Cl.
| F16H 13/00 | (2006.01) |
| F16H 55/32 | (2006.01) |
| F16H 13/02 | (2006.01) |
| B60K 17/348 | (2006.01) |
| F16H 13/10 | (2006.01) |

(52) U.S. Cl.
CPC .............. *F16H 13/02* (2013.01); *B60K 17/348* (2013.01); *F16H 13/10* (2013.01)
USPC .......................................................... 476/67

(58) Field of Classification Search
USPC .................................................. 476/67, 70
See application file for complete search history.

(56) References Cited

U.S. PATENT DOCUMENTS

| 2002/0147068 A1* | 10/2002 | Chikaraishi et al. ............ 476/21 |
| 2005/0143211 A1* | 6/2005 | Yamamoto .................... 475/183 |
| 2008/0220931 A1* | 9/2008 | Yamamoto ...................... 476/42 |
| 2009/0170656 A1* | 7/2009 | Yamamoto ........................ 476/9 |

FOREIGN PATENT DOCUMENTS

| DE | 1212810 | 3/1966 |
| DE | 224 378 A1 | 7/1985 |
| JP | 2002-349653 A | 12/2002 |
| JP | 2005-188701 A | 7/2005 |
| JP | 2007187275 A * | 7/2007 |
| WO | WO 2006/009292 A1 | 1/2006 |

OTHER PUBLICATIONS

Chinese Office Action, Aug. 1, 2013, 6 pages.

* cited by examiner

*Primary Examiner* — Troy Chambers
*Assistant Examiner* — Emily Cheng
(74) *Attorney, Agent, or Firm* — Foley & Lardner LLP

(57) ABSTRACT

A friction gearing has housing and a unit housed in the housing, the unit including a first roller, a second roller and rotatable support plates. The first roller and the second roller are in frictional engagement with each other under a radial pressing force. The radial pressing force is variable in response to a change in the radial distance between the first and the second roller. The rotatable support plates support the first and the second rollers and receive a resisting force that is generated when the first and the second rollers come in contact under the pressing force. The unit is received in the housing with the axis of rotation of the first roller radially fixed while the first roller is rotatably supported by the housing.

6 Claims, 13 Drawing Sheets

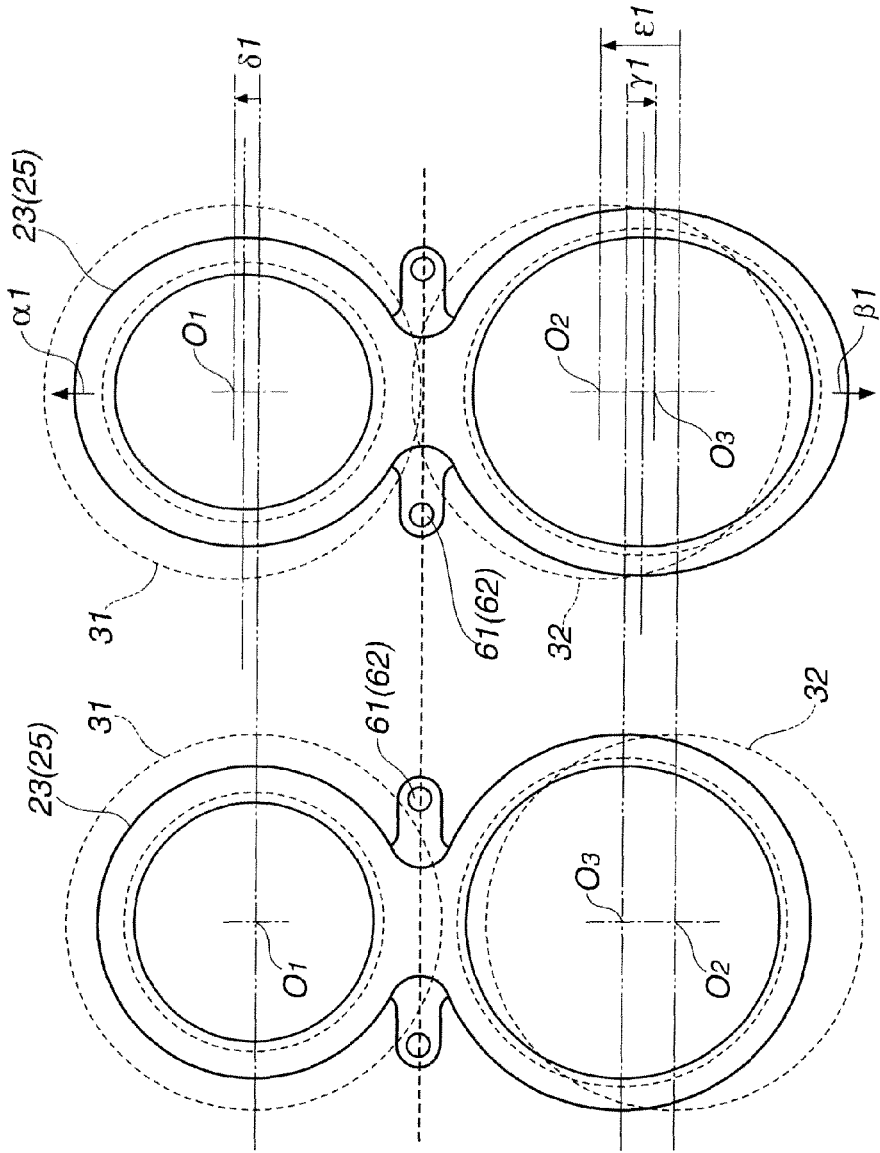

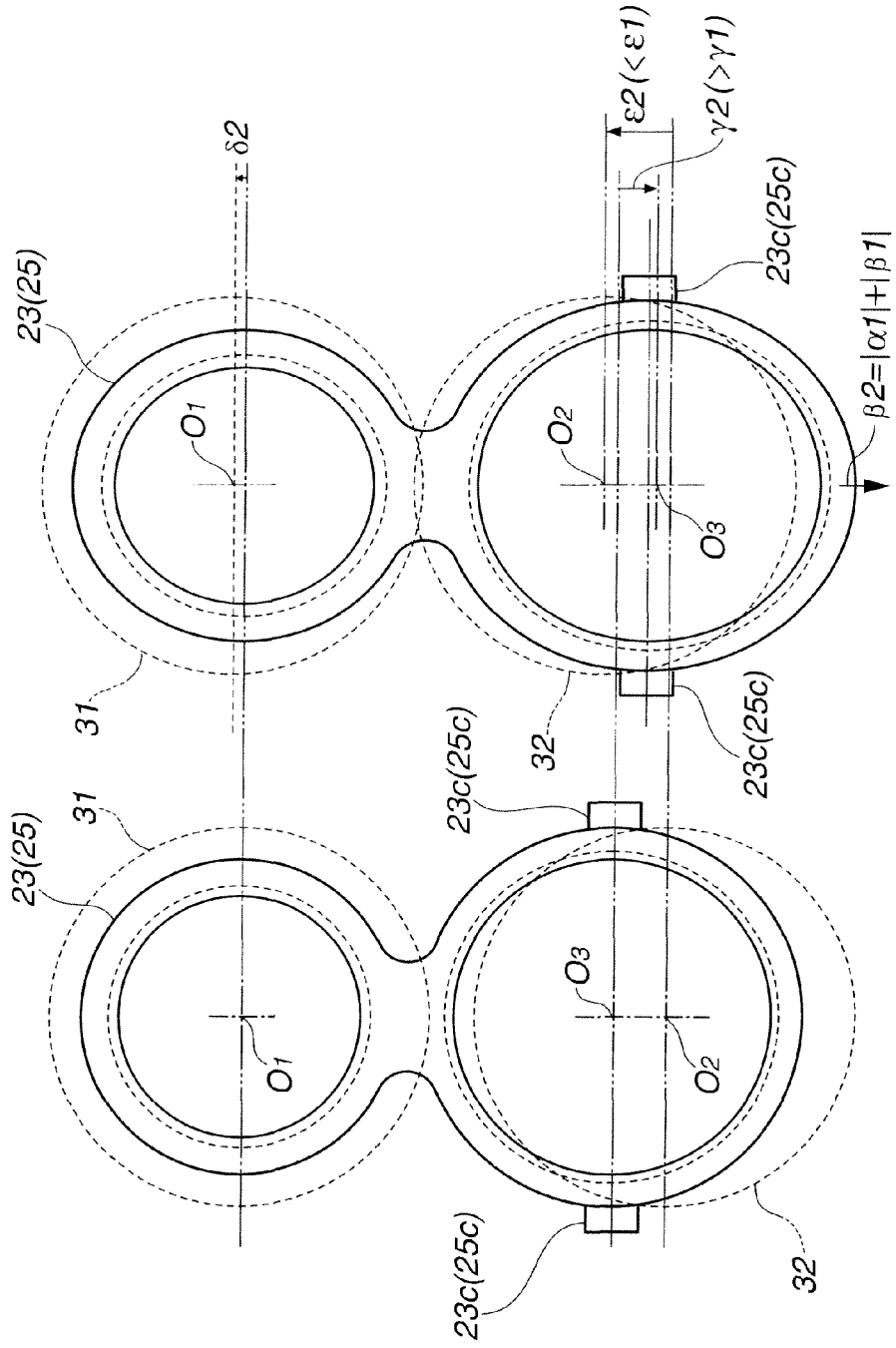

DISPLACEMENT OF $O_2$

DISPLACEMENT OF $O_2$

FIRST EMBODIMENT

SECOND EMBODIMENT

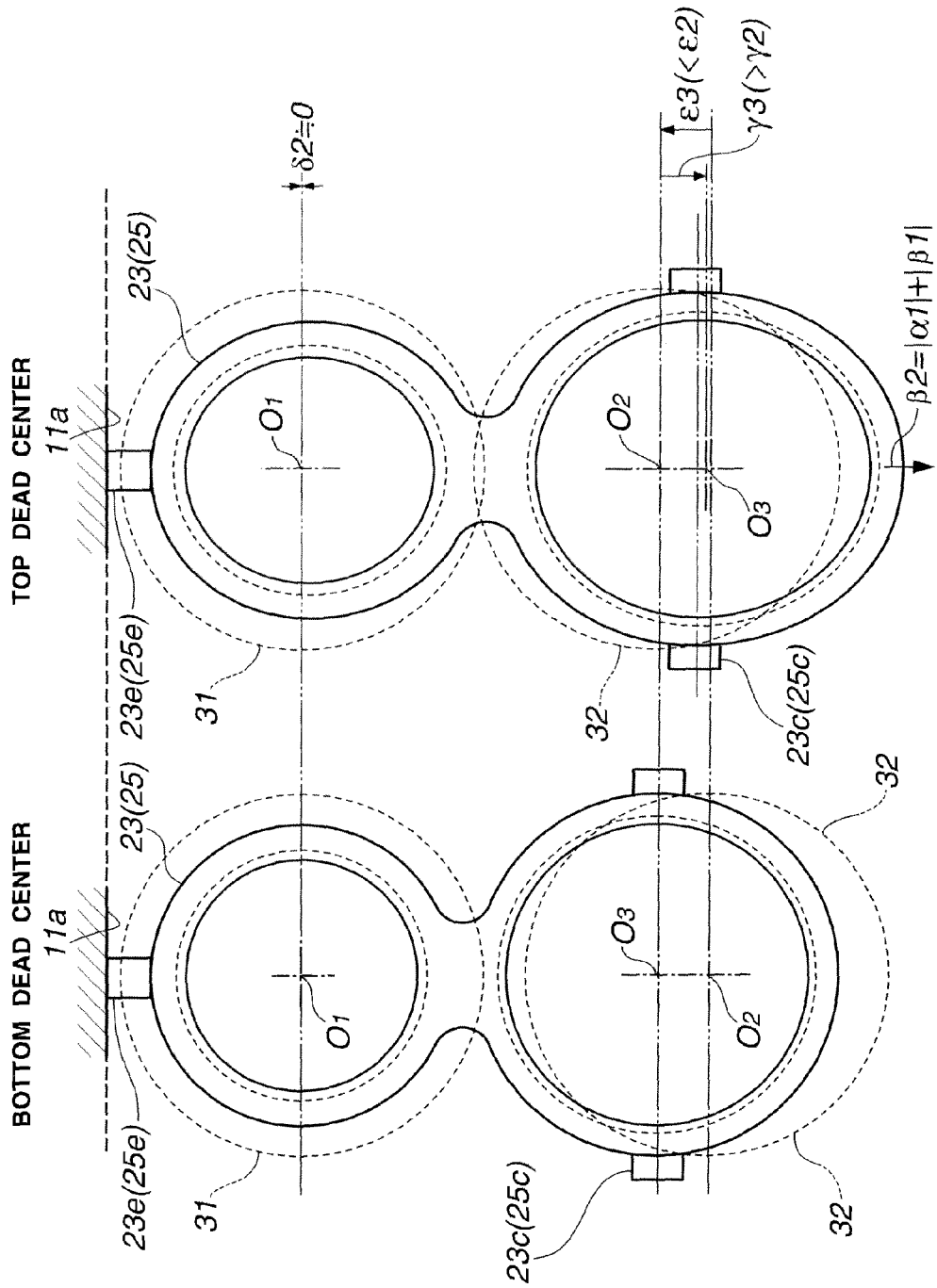

FRICTION GEARING

TECHNICAL FIELD

The present invention relates to a proposal of improvement of a friction gearing useful as a driving force distribution device, such as a transfer for a four wheel drive vehicle.

BACKGROUND OF THE INVENTION

A patent document 1 discloses a commonly known driving force distribution device. This driving force distribution device is configured to transmit torque through indirect radial pressing contact between a first roller and a second roller with a torque capacity varying according to a state of the inter-roller radial pressing contact.

Patent document 1 proposes an idea that both of the rollers are supported by a common support plate, and housed in a housing, wherein the support plate bears a reaction force caused by the inter-roller radial pressing contact, and the housing is prevented from being reached by the reaction force.

Patent document 1: JP 2002-349653 A

SUMMARY OF THE INVENTION

In order to make a friction gearing of this type capable of varying its transmitted torque capacity, it is necessary to configure the friction gearing to vary the inter-roller radial pressing force. This is implemented by a configuration that one of first and second rollers, for example, the second roller, is made capable of being displaced with respect to the first roller so that the inter-roller radial pressing force can be varied according to the relative radial displacement of the second roller.

The following considers a situation in which the second roller is made to approach the first roller radially so as to increase the inter-roller radial pressing force (transmitted torque capacity). In this situation, the rotation axis of the second roller approaches the rotation axis of the first roller, and thereby increases an offset from a center of a torque transmitting shaft that transmits torque between the second roller and itself. The increase in the offset causes an increase in a relative radial displacement to be absorbed by a universal coupling between the second roller and the torque transmitting shaft, and thereby serves to adversely affect the durability of a driveline including the universal coupling.

On the other hand, in the situation in which the second roller is made to approach the first roller radially so as to increase the inter-roller radial pressing force (transmitted torque capacity), the reaction force increases so as to increase an amount of extension of the common rotation support plate due to a stretching force acting on the first roller and the second roller away from each other.

The increase in the amount of extension of the rotation support plate serves to reduce the offset between the rotation axis of the second roller and the center of the torque transmitting shaft in the situation where the inter-roller transmitted torque capacity is increased. By nature, this serves to reduce the offset (relative radial displacement) that is to be absorbed by the universal coupling between the second roller and the torque transmitting shaft, and thereby enhance the durability of the driveline including the second roller and the torque transmitting shaft.

However, patent document 1 and other conventional documents are silent at all about how to arrange the rotation support plate with respect to the housing. If the rotation support plate is attached to a section of the housing between the first roller and the second roller based a common idea without no special idea about arrangement of the rotation support plate with respect to the housing, it is impossible to take full advantage of the function of reducing the increase in the offset between the rotation axis of the second roller and the center of the torque transmitting shaft in the situation where the inter-roller transmitted torque capacity is increased, and thereby enhancing the durability of the driveline, and there is room to improve this point, as described in the following.

Specifically, if the rotation support plate is attached to the section of the housing between the first roller and the second roller, the stretching force acting on the first roller and the second roller away from each other serves to extend the rotation support plate toward the first roller side on one hand, and extend the rotation support plate toward the second roller side on the other hand, so that the amount of extension of the rotation support plate is divided between the first roller side and the second roller side.

In this connection, only the amount of extension of the rotation support plate toward the second roller side can contribute to the function of reducing the increase in the offset between the rotation axis of the second roller and the center of the torque transmitting shaft, and thereby enhancing the durability of the driveline. Accordingly, if the rotation support plate is attached to the section of the housing between the first roller and the second roller, it is just possible to take half advantage of the function of reducing the increase in the offset between the rotation axis of the second roller and the center of the torque transmitting shaft, and thereby enhancing the durability of the driveline.

In view of the foregoing, it is an object of the present invention to propose a friction gearing capable of taking full advantage of the function of reducing the increase in the offset between the rotation axis of the second roller and the center of the torque transmitting shaft, and thereby enhancing the durability of the driveline.

According to one mode of the present invention, a friction gearing comprises: a housing; and a unit housed in the housing, wherein the unit includes a first roller, a second roller and a rotation support plate; wherein: the first and second rollers are configured to perform frictional transmission in radial pressing contact with each other, and vary a state of the radial pressing contact between the first and second rollers by radial displacement of the second roller with respect to the first roller; the rotation support plate is configured to support the first and second rollers, and receive a reaction force caused by the radial pressing contact between the first and second rollers; and the unit is supported in the housing in a manner that the first roller is rotatably supported with respect to the housing with a rotation axis of the first roller restrained radially.

BRIEF DESCRIPTION OF THE DRAWINGS

FIG. 3 shows a bearing support employed in the driving force distribution device of FIG. 2, wherein FIG. 3A is a front view of the bearing support, and FIG. 3B is a side sectional view of the bearing support;

FIG. 6 shows a bearing support employed in the driving force distribution device of FIG. 5, wherein

FIG. 8 is a diagram showing a situation in which in the driving force distribution device of FIG. 7, the bearing support is extended when a second roller is brought from a bottom dead center position to a top dead center position closer to a first roller, wherein FIG. 8A is a diagram showing a condition in which the second roller is in the bottom dead center position, and FIG. 8B is a diagram showing a condition in which the second roller is in the top dead center position;

FIG. 9 is a diagram showing a situation in which in the driving force distribution device of FIG. 2, the bearing support is extended when a second roller is brought from a bottom dead center position to a top dead center position closer to a first roller, wherein FIG. 9A is a diagram showing a condition in which the second roller is in the bottom dead center position, and FIG. 9B is a diagram showing a condition in which the second roller is in the top dead center position;

FIG. 13 is a diagram showing a situation in which in the driving force distribution device of FIG. 5, the bearing support is extended when a second roller is brought from a bottom dead center position to a top dead center position closer to a first roller, wherein FIG. 13A is a diagram showing a condition in which the second roller is in the bottom dead center position, and FIG. 13B is a diagram showing a condition in which the second roller is in the top dead center position.

MODE(S) FOR CARRYING OUT THE INVENTION

<Representative Effect of the Present Invention>

A friction gearing according to embodiments of the present invention described below, in which a unit which includes a first roller, a second roller and a rotation support plate is supported in a housing in a manner that the first roller is rotatably supported with respect to the housing with a rotation axis of the first roller restrained radially, can concentrate an amount of extension of the rotation support plate to extension toward a second roller side without dividing same between a first roller side and the second roller side, wherein the amount of extension of the rotation support plate is caused by a stretching force acting on the first roller and the second roller away from each other due to radial pressing contact between the first roller and the second roller, and the entire amount of extension of the rotation support plate becomes an amount of extension of the rotation support plate toward the second roller side.

Accordingly, when the second roller is made to approach the first roller to increase the inter-roller radial pressing force, it is possible to sufficiently reduce an increase in an offset between a rotation axis of the second roller and a torque transmitting shaft associated with the second roller by the amount of extension of the rotation support plate concentrated to extension toward the second roller side, and thereby reduce the offset (relative radial displacement) that is to be absorbed by a universal coupling between the second roller and the torque transmitting shaft, and thereby enhance the durability of a driveline including the second roller and the torque transmitting shaft.

Figure 3:
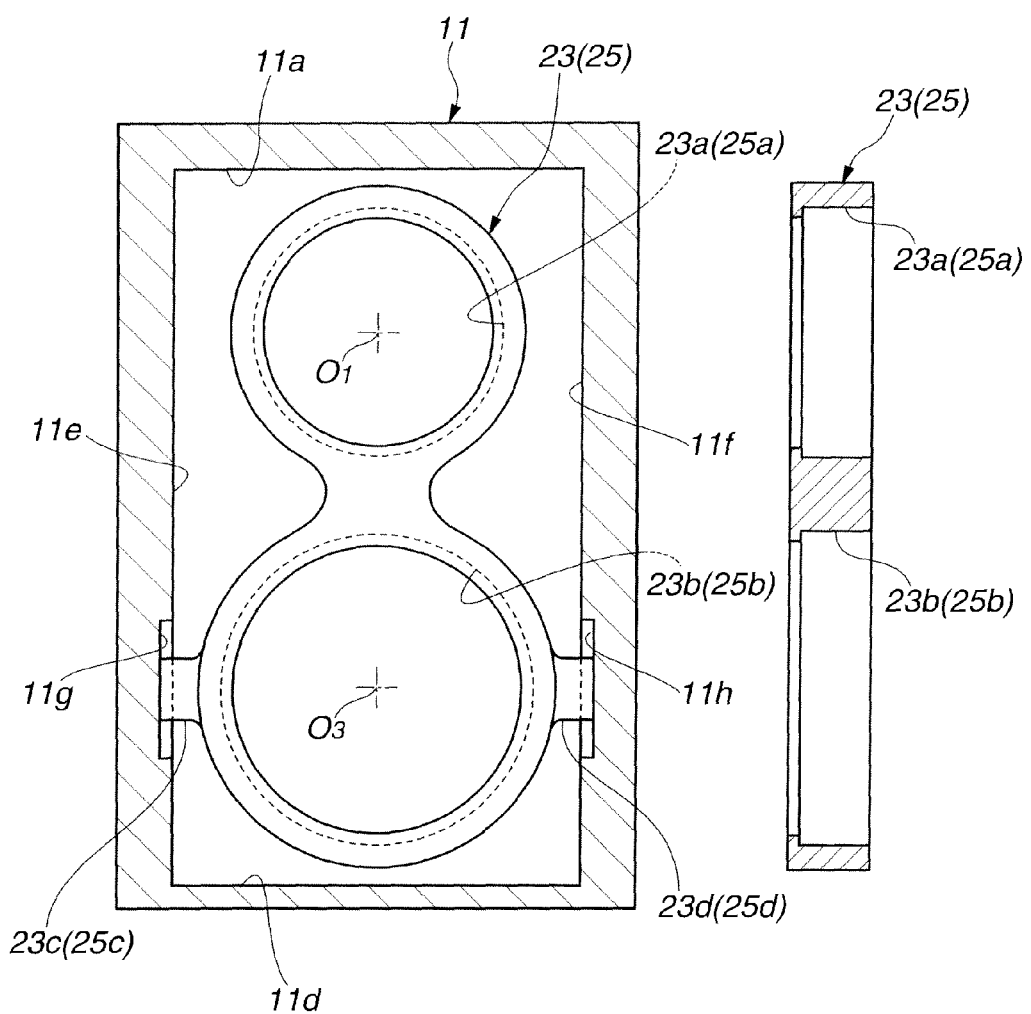
Figure 4:
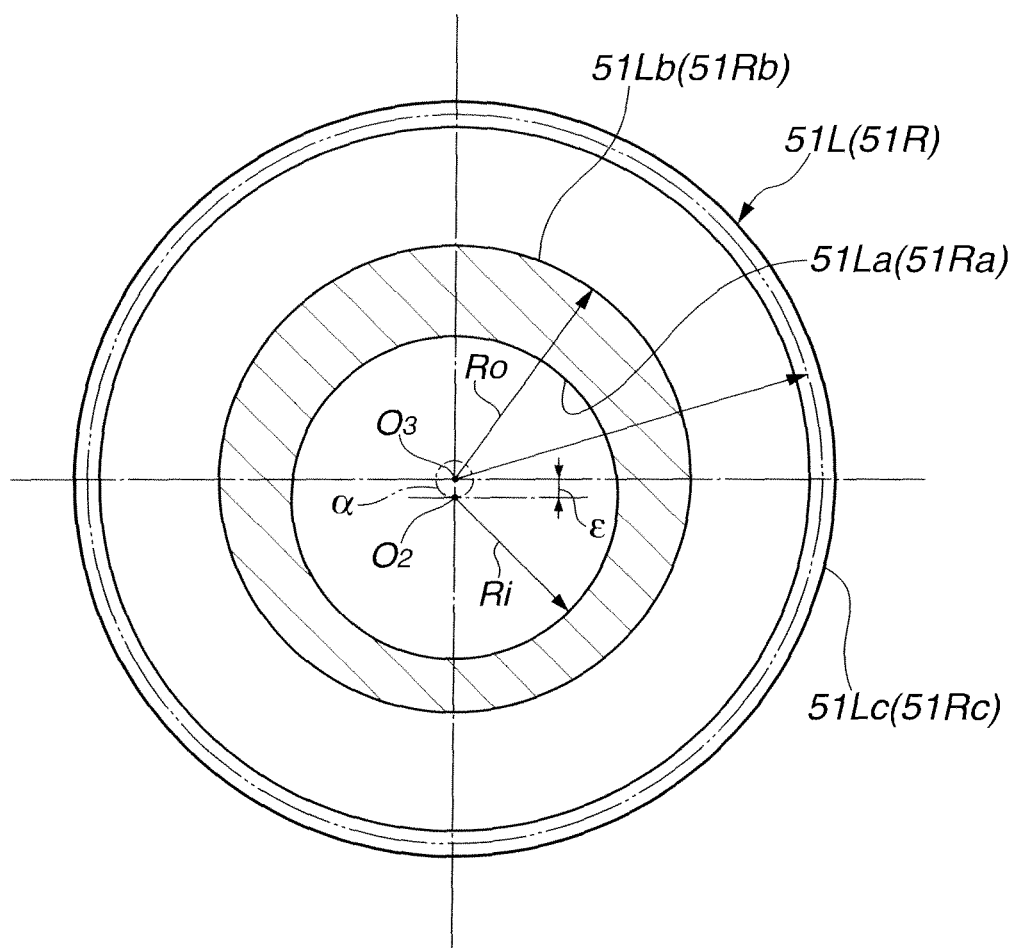
FIG. 4 is a sectional view of a crankshaft employed in the driving force distribution device of FIG. 2.
Figure 5:
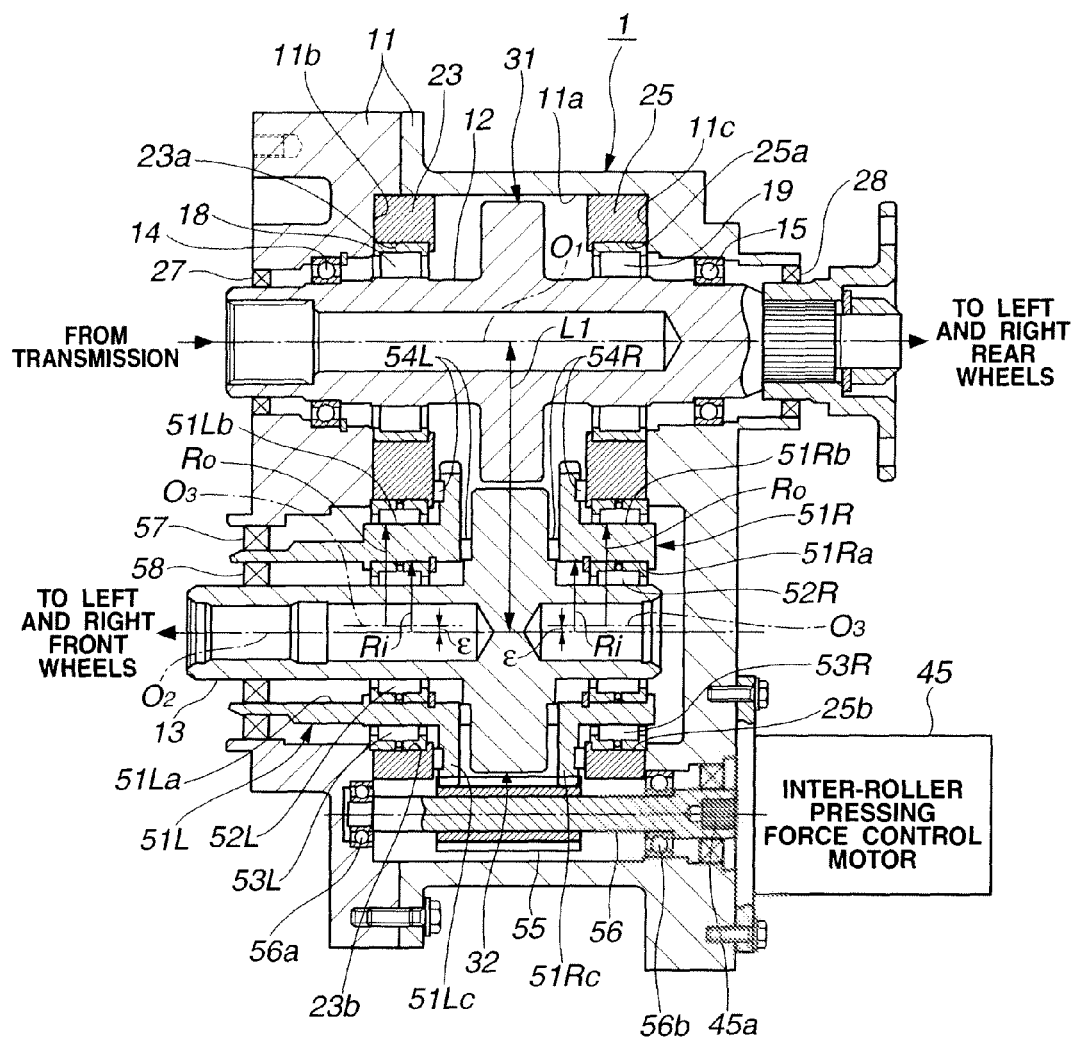
FIG. 5 is a side sectional view similar to FIG. 2, showing a driving force distribution device according to a second embodiment of the present invention.
Figures 6A, 6B:
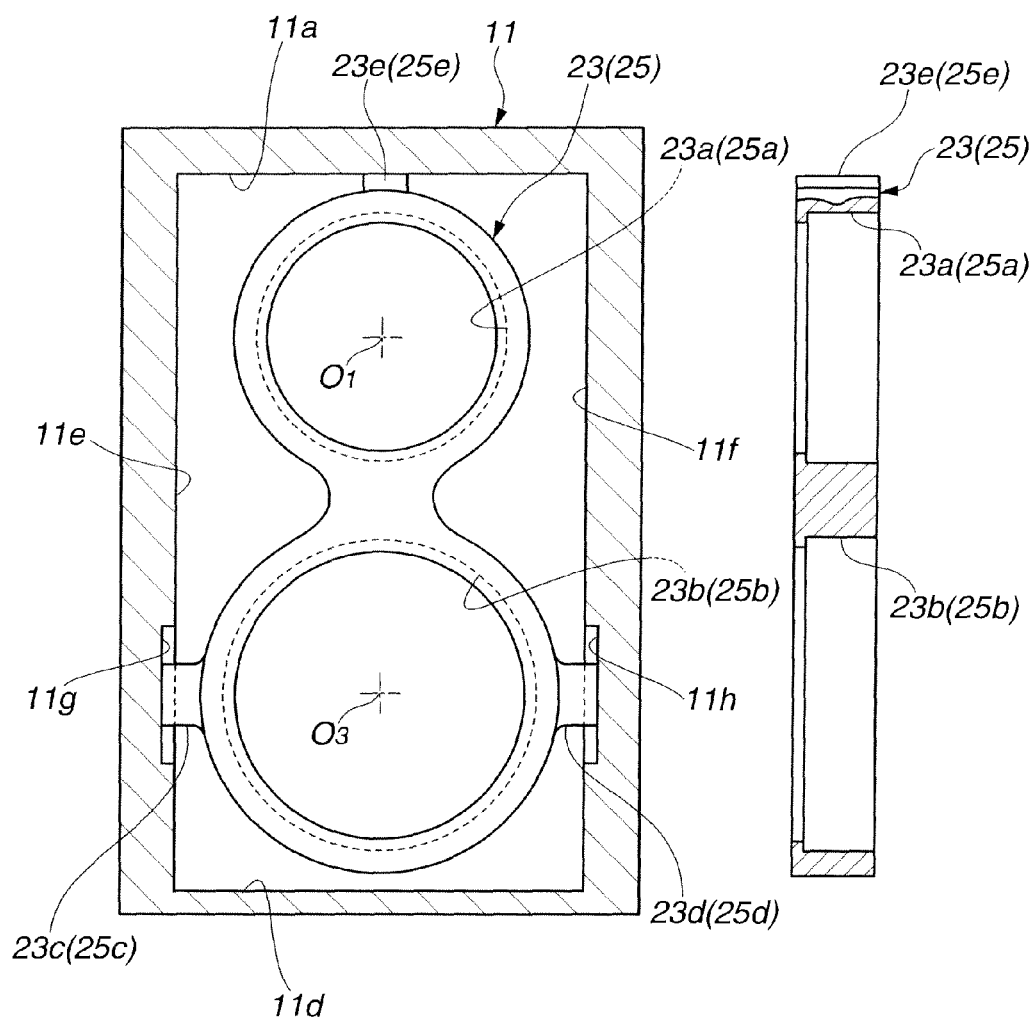
FIG. 6A is a front view of the bearing support.
FIG. 6B is a side sectional view of the bearing support.

The following describes modes for carrying out the present invention in detail with reference to a first embodiment shown in FIGS. 1 to 4, and a second embodiment shown in FIGS. 5 and 6.

Configuration of First Embodiment

Figure 1:
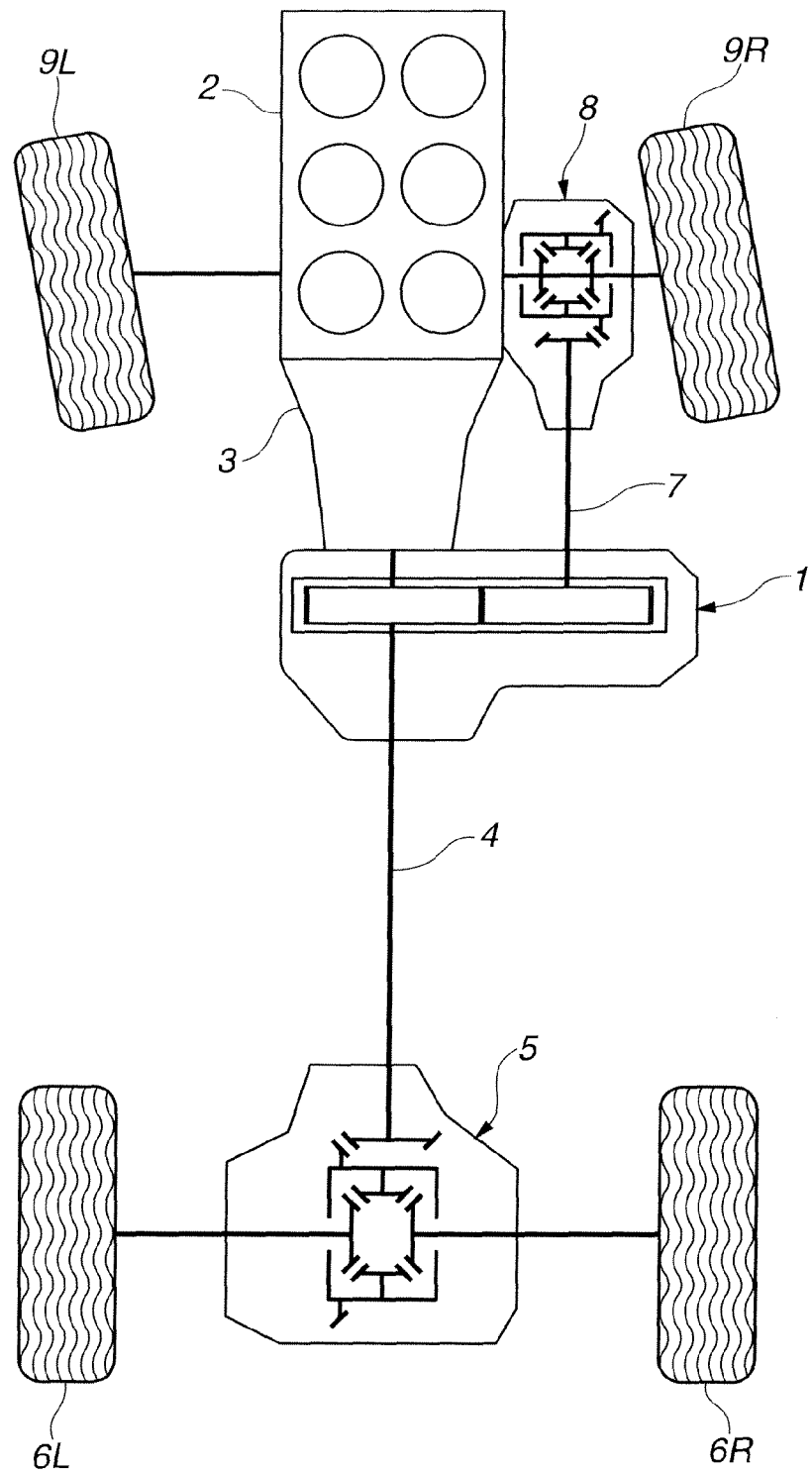
FIG. 1 is a schematic plan view from above a four wheel drive vehicle, showing a powertrain of the four wheel drive vehicle which is provided with a friction gearing according to a first embodiment of the present invention, wherein the friction gearing is constructed as a driving force distribution device.

FIGS. 1 to 4 show the first embodiment of the present invention. FIG. 1 is a schematic plan view from above a four wheel drive vehicle, showing a powertrain of the four wheel drive vehicle which is provided with a friction gearing according to the first embodiment of the present invention, wherein the friction gearing is constructed as a driving force distribution device 1.

The four wheel drive vehicle of FIG. 1 is based on a rear wheel drive vehicle in which rotation from an engine 2 is shifted by a transmission 3, and then transmitted through a rear propeller shaft 4 and a rear final drive unit 5 to left and right rear wheels 6L, 6R, and constructed so that a part of torque to left and right rear wheels (main driving wheels) 6L, 6R is transmitted by driving force distribution device 1 through a front propeller shaft 7 and a front final drive unit 8 to left and right front wheels (auxiliary driving wheels) 9L, 9R, thus achieving four wheel driving.

Driving force distribution device 1 is thus configured to set torque distribution between left and right rear wheels (main driving wheels) 6L, 6R, and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R. In this embodiment, driving force distribution device 1 is constructed as shown in FIG. 2.

Figure 2:
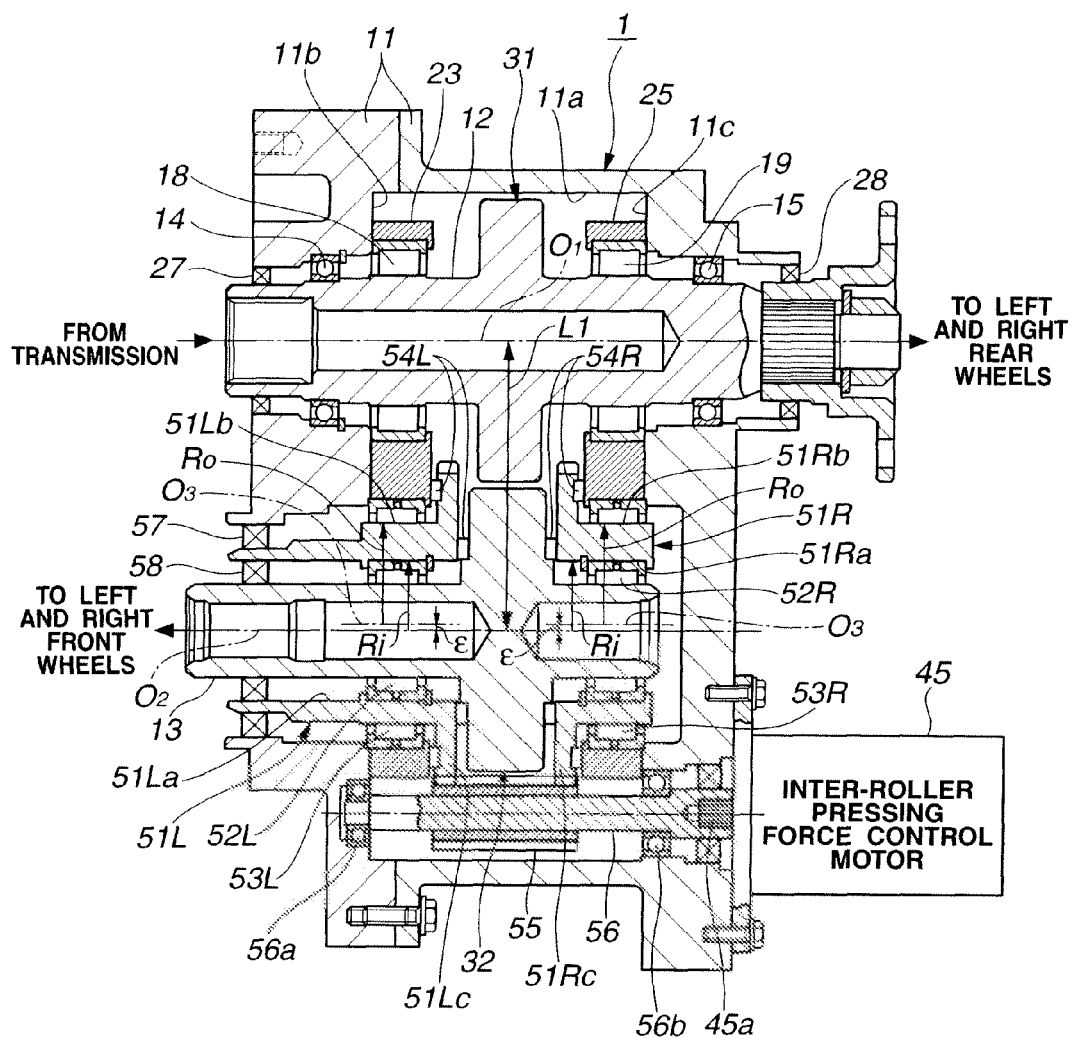
FIG. 2 is a side sectional view of the driving force distribution device of FIG. 1.

In FIG. 2, an input shaft 12 and an output shaft 13 are arranged to laterally cross in a housing 11, which are parallel to one another. Input shaft 12 is rotatably supported with respect to housing 11 by ball bearings 14, 15 for free rotation of input shaft 12 about an axis O1.

Input shaft 12 is rotatably supported also with respect to bearing supports 23, 25 by roller bearings 18, 19. Accordingly, each bearing support 23, 25 is formed with an opening 23a, 25a to which roller bearing 18, 19 is fitted, as shown in FIGS. 3A and 3B. Each bearing support 23, 25 is a common rotation support plate supporting both of input shaft 12 and output shaft 13. Each bearing support 23, 25 is arranged in housing 11 in a manner that bearing support 23, 25 is in contact with a corresponding inner surface 11b, 11c of housing 11 as shown in FIG. 2, but is not fixed to inner surface 11b, 11c.

Both ends of input shaft 12 are made to extend out of housing 11, sealed liquid-tightly by seal rings 27, 28. The left end (in FIG. 2) of input shaft 12 is coupled to an output shaft of transmission 3 (see FIG. 1), and the right end (in FIG. 2) of input shaft 12 is coupled through rear propeller shaft 4 (see FIG. 1) to rear final drive unit 5.

Input shaft 12 is formed integrally with a first roller 31 substantially at the center of input shaft 12 in the axial direction of input shaft 12, wherein first roller 31 is coaxially arranged with input shaft 12. Output shaft 13 is formed integrally with a second roller 32 substantially at the center of output shaft 13 in the axial direction of output shaft 13, wherein second roller 32 is coaxially arranged with output shaft 13. First roller 31 and second roller 32 are arranged in a common plane perpendicular to the axes of input shaft 12 and output shaft 13.

Output shaft 13 is rotatably supported with respect to housing 11 in an indirect manner with the following configuration. Namely, hollow crankshafts 51L, 51R are located at respective axial ends of second roller 32 that is formed integrally with output shaft 13 substantially at the center of output shaft 13 in the axial direction of output shaft 13, and crankshafts 51L, 51R are clearance-fitted to respective end portions of output shaft 13. Both ends of output shaft 13 are fitted in central holes 51La, 51Ra (whose semidiameter is represented by Ri in the drawings) of crankshafts 51L, 51R. Bearings 52L, 52R are disposed in clearance-fitting portions between central holes 51La, 51Ra of crankshafts 51L, 51R and the end portions of output shaft 13, so that output shaft 13 is supported in the central holes 51La, 51Ra of crankshafts 51L, 51R for free rotation about a central axis O2 of central holes 51La, 51Ra.

As clearly shown in FIG. 4, crankshafts 51L, 51R are formed with peripheries 51Lb, 51Rb (whose semidiameter is represented by Ro in the drawings) that are eccentric with respect to central holes 51La, 51Ra (central axis O2), so that the central axis O3 of eccentric peripheries 51Lb, 51Rb is eccentric with respect to the axis O2 of central holes 51La, 51Ra (the rotation axis of second roller 32) by eccentricity ε. Eccentric peripheries 51Lb, 51Rb of crankshafts 51L, 51R are rotatably supported in the respective bearing supports 23, 25 through bearings 53L, 53R. Accordingly, each bearing support 23, 25 is formed with an opening 23b, 25b to which bearing 53L, 53R is fitted, as shown in FIGS. 3A and 3B.

Each bearing support 23, 25 is a common rotation support plate supporting both of input shaft 12 and output shaft 13 as described above, and also serves as a common rotation support plate for supporting both of first roller 31 and second roller 32 because first roller 31 and second roller 32 are formed integrally with input shaft 12 and output shaft 13, respectively. Each bearing support 23, 25 is configured to have such a size that bearing support 23, 25 is out of contact with an inner wall 11a of housing 11 wherein input shaft 12 is arranged between inner wall 11a and output shaft 13 as shown in FIGS. 2 and 3, and is out of contact with an inner wall 11d of housing 11 wherein output shaft 13 is arranged between inner wall 11d and input shaft 12 as shown in FIG. 3.

Moreover, each bearing support 23, 25 is provided with a projection 23c, 25c and a projection 23d, 25d which serves to prevent bearing support 23, 25 from swinging about axis O1 of input shaft 12 (first roller 31). Each of projection 23c, 25c and projection 23d, 25d is arranged in contact with a bottom surface of a guide groove 11g, 11h formed in the corresponding inner surface 11e, 11f of the housing. Each guide groove 11g, 11h is formed to have a narrow shape extending in a tangential line of opening 23b, 25b, and thereby allow projection 23c, 25c to be displaced in the same direction.

Crankshafts 51L, 51R, which are rotatably supported by bearing supports 23, 25 as described above, and second roller 32, are positioned in the axial direction by thrust bearings 54L, 54R, respectively, as shown in FIG. 2.

As shown in FIG. 2, the ends of crankshafts 51L, 51R that are closer to and face one another are formed integrally with ring gears 51Lc, 51Rc that have identical specifications and are arranged coaxially with eccentric peripheries 51Lb, 51Rb. Ring gears 51Lc, 51Rc are meshed with a common crankshaft driving pinion 55, under condition that crankshafts 51L, 51R are in rotational positions such that the eccentric peripheries 51Lb, 51Rb are aligned with one another in the circumferential direction.

Crankshaft driving pinion 55 is coupled to a pinion shaft 56. Both ends of pinion shaft 56 are rotatably supported with respect to housing 11 by bearings 56a, 56b. The right end of pinion shaft 56 on the right side of FIG. 2 is exposed outside of housing 11. The exposed end surface of pinion shaft 56 is drivingly coupled, for example, by serration coupling, to an output shaft 45a of an inter-roller pressing force control motor 45 that is attached to housing 11.

Accordingly, by controlling the rotational positions of crankshafts 51L, 51R through the pinion 55 and ring gears 51Lc, 51Rc by inter-roller pressing force control motor 45, the rotation axis O2 of output shaft 13 and second roller 32 revolves along a locus circle a indicated by a broken line in FIG. 4. The revolution of rotation axis O2 causes a change in an inter-axis distance L1 between the first roller and the second roller (see FIG. 2), and allows to control the radial pressing force from second roller 32 to first roller 31 (inter-roller transmitted torque capacity) arbitrarily between zero and a maximum value.

Crankshaft 51L and output shaft 13 are made to project from housing 11 on the left side of FIG. 2. At the projecting portions, a seal ring 57 is disposed between housing 11 and crankshaft 51L, and a seal ring 58 is disposed between crankshaft 51L and output shaft 13. Seal rings 57, 58 liquid-tightly seal the projecting portions of crankshaft 51L and output shaft 13 that project from housing 11.

The center of the inside periphery and the center of the outside periphery of crankshaft 51L are set eccentric from one another at its end portion where seal rings 57, 58 are disposed, as at the portion where output shaft 13 is supported. Seal ring 57 is disposed between the outside periphery of the end portion of crankshaft 51L and housing 11, and seal ring 58 is disposed between the inside periphery of the end portion of crankshaft 51L and output shaft 13. This sealing construction makes it possible to preferably seal the place where output shaft 13 projects from housing 11, although the rotation axis O2 of output shaft 13 revolves according to the revolution of output shaft 13.

Driving Force Distribution Control According to First Embodiment

The following describes a driving force distribution control according to the first embodiment shown in FIGS. 1 to 4. On one hand, the torque from transmission 3 (see FIG. 1) to input shaft 12 is transmitted directly from input shaft 12 through rear propeller shaft 4 and rear final drive unit 5 (see FIG. 1 for both) to left and right rear wheels 6L, 6R (main driving wheels).

On the other hand, driving force distribution device 1 according to this embodiment can direct to output shaft 13 a part of torque to left and right rear wheels 6L, 6R (main driving wheels), through first roller 31 and second roller 32, when controlling the rotational position of crankshafts 51L, 51R through pinion 55 and ring gears 51Lc, 51Rc by inter-roller pressing force control motor 45, and thereby setting the inter-roller-axis distance L1 smaller than the sum of the semidiameters of first roller 31 and second roller 32, because first and second rollers 31, 32 have an inter-roller transmitted torque capacity varying according to the radial mutually pressing force.

In this connection, during torque transmission, the radial pressing reaction force between first roller 31 and second roller 32 is received by bearing supports 23, 25 common to these rollers, and thereby prevented from being transmitted to housing 11. This eliminates the necessity of enhancing the strength of housing 11 to resist the radial pressing reaction force between first roller 31 and second roller 32, and thereby prevents the weight and cost from being adversely affected.

After the above, the torque is transmitted to left and right front wheels (auxiliary driving wheels) 9L, 9R from the left end (in FIG. 2) of output shaft 13 through front propeller shaft 7 (see FIG. 1) and front final drive unit 8 (see FIG. 1). This allows four wheel driving of the vehicle wherein all of left and right rear wheels (main driving wheels) 6L, 6R and left and right front wheels (auxiliary driving wheels) 9L, 9R are driven.

Incidentally, during inter-roller radial mutually pressing force control (inter-roller transmitted torque capacity control) by inter-roller pressing force control motor 45, the output shaft 13 and second roller 32 (their rotation axis O2) revolve about eccentric axis O3. The displacement of revolution of output shaft 13 and second roller 32 (their rotation axis O2) can be absorbed by a universal coupling connecting the output shaft 13 and front propeller shaft 7 to each other, so that torque transmission to left and right front wheels (auxiliary driving wheels) 9L, 9R is not adversely affected, even without an eccentric coupling.

Action and Effect of the First Embodiment

However, if the offset between front output shaft 13 and second roller 32 (their rotation axis O2) and propeller shaft 7 is large, the relative radial displacement to be absorbed by the universal coupling between output shaft 13 and front propeller shaft 7 becomes large, to adversely affect the durability of the driveline including the universal coupling. Accordingly, it is desirable that the offset between output shaft 13 and second roller 32 (their rotation axis O2) and front propeller shaft 7 is as small as possible. This demand can be satisfied by the following principle of the driving force distribution device according to the embodiment described above.

Prior to explanation about this principle, the following describes the offset between output shaft 13 and second roller 32 (their rotation axis O2) and front propeller shaft 7 for a case in which central sections of bearing supports 23, 25 between input shaft 12 and output shaft 13 are fixed to inner surfaces 11b, 11c by bolts 61, 62 or the like in a construction basically similar as in FIG. 2.

When second roller 32 is made to approach first roller 31 radially to increase the inter-roller radial pressing force (inter-roller transmitted torque capacity), the rotation axis O2 of second roller 32 revolves from a bottom dead center position shown in FIG. 8A to a top dead center position shown in FIG. 8B to approach the rotation axis O1 of first roller 31, causing an increase in the offset between front propeller shaft 7 and the rotation axis O2 of second roller 32. The increase in the offset causes an increase in the relative radial displacement to be absorbed by the universal coupling between output shaft 13 and front propeller shaft 7, and thereby adversely affects the durability of the driveline including the universal coupling.

On the other hand, when second roller 32 is made to approach first roller 31 radially to increase the inter-roller radial pressing force (inter-roller transmitted torque capacity), the reaction force increases, and causes a stretching force acting on the first roller 31 and second roller 32 away from each other, and thereby increases the amount of extension of bearing support 23, 25.

The increase in extension of bearing support 23, 25 serves to reduce the increase in the offset between front propeller shaft 7 and rotation axis O2 of second roller 32 when the inter-roller transmitted torque capacity is increased, and suppress the offset (relative radial displacement) that is to be absorbed by the universal coupling between output shaft 13 and front propeller shaft 7, and thereby enhance the durability of the driveline including the universal coupling.

Figure 7:
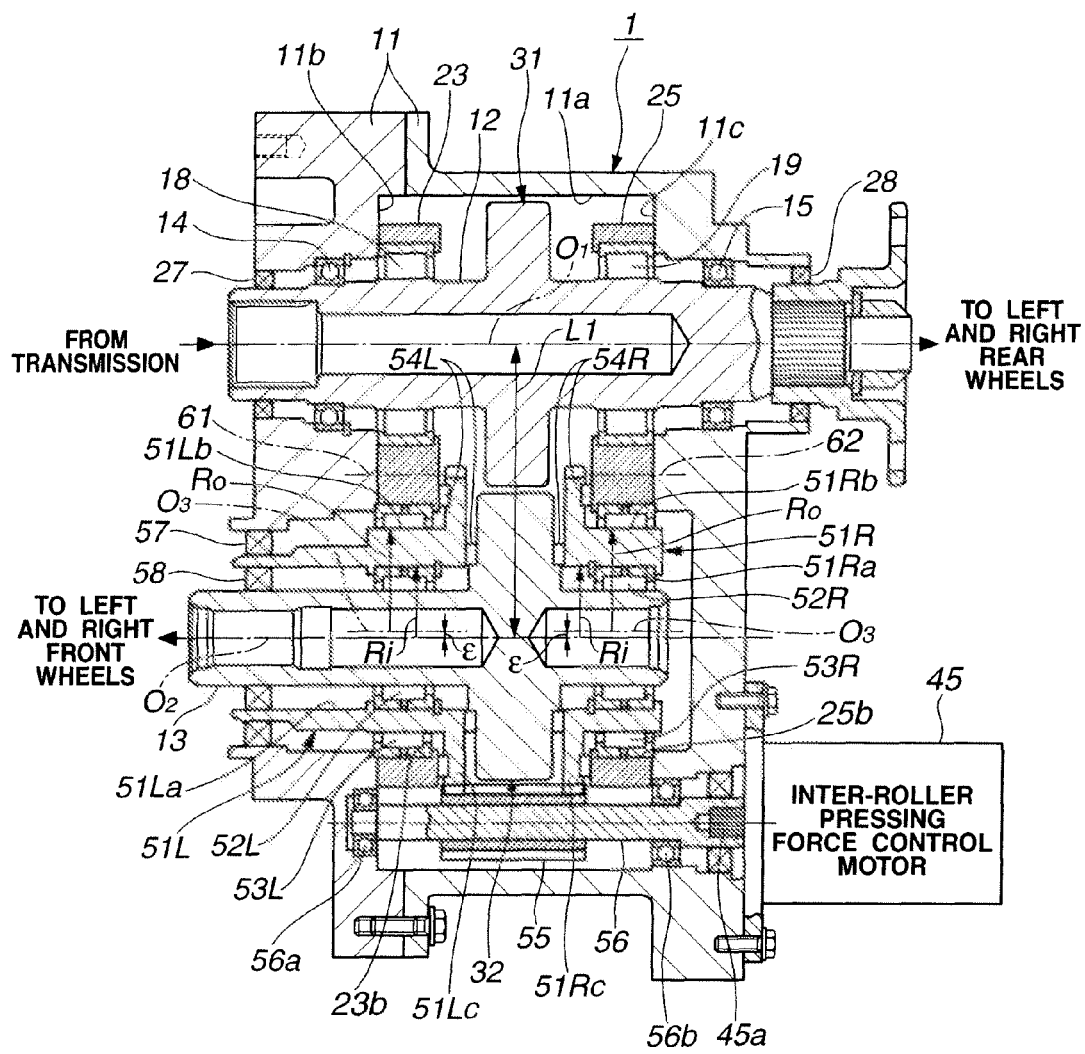
FIG. 7 is a side sectional view similar to FIG. 2, showing a driving force distribution device which is configured based on a common idea by attaching the bearing support to a midpoint section of the housing in a vertical direction of the housing in the driving force distribution device of FIG. 2.

However, in the case shown in FIG. 7 where the central sections of bearing supports 23, 25 are fixed to housing inner surfaces 11b, 11c by bolts 61, 62, the stretching force acting on the first roller 31 and second roller 32 away from each other causes on one hand an extension of bearing support 23, 25 toward the first roller side as indicated by an arrow α1 in FIG. 8B, and thereby displaces rotation axis O1 of first roller 31 in the same direction by δ1, and causes on the other hand an extension of bearing support 23, 25 toward the second roller side as indicated by extension β1 in FIG. 8B, and thereby displaces revolution center O3 of second roller 32 in the same direction by γ1. In this way, the amount of extension of bearing support 23, 25 is distributed to the first roller side and the second roller side.

In this connection, the function of reducing the increase in the offset between front propeller shaft 7 and rotation axis O2 of second roller 32 when the inter-roller transmitted torque capacity is increased, and thereby enhancing the durability of the driveline, can be achieved only by extension 131 of bearing support 23, 25 toward the second roller side which relates to displacement ε1 of rotation axis O2 from the bottom dead center position shown in FIG. 8A to the top dead center position shown in FIG. 8B (namely, only by displacement γ1 of revolution center O3 of the second roller due to this extension β1).

However, in the case shown in FIG. 7 where the central sections of bearing supports 23, 25 are fixed to housing inner surfaces 11b, 11c by bolts 61, 62, the extension β1 of bearing support 23, 25 toward the second roller side (displacement γ1 of revolution center O3 of the second roller) is small because of the double distribution described above, so that it is impossible to sufficiently reduce the displacement ε1 of rotation axis O2 of the second roller from the bottom dead center position shown in FIG. 8A to the top dead center position shown in FIG. 8B. Accordingly, it is only possible to take almost half of advantage of the function of reducing the increase in the offset between front propeller shaft 7 and rotation axis O2 of second roller 32 while utilizing the extension of bearing support 23, 25 when the inter-roller transmitted torque capacity is increased, and thereby enhancing the durability of the driveline associated with second roller 32 and front propeller shaft 7.

In contrast, the driving force distribution device according to the first embodiment shown in FIGS. 1 to 4 in which the unit is composed as a primary assembly of first roller 31 including input shaft 12, second roller 32 including output shaft 13, and bearing support 23, 25 that is a common rotation support plate supporting both of first roller 31 and second roller 32, and the unit including the first roller 31 (input shaft 12), second roller 32 (output shaft 13) and the common bearing support 23, 25 (as a primary assembly in this embodiment) is supported in housing 11 by rotatably supporting input shaft 12 with respect to housing 11 while restraining the input shaft 12 in the radial direction by ball bearings 14, 15, can produce the following action and effect.

Specifically, according to the configuration according to the first embodiment, the rotation axis O1 of first roller 31 is restrained from being displaced with respect to housing 11 in the direction away from second roller 32 even with extension of bearing support 23, 25, whereas only revolution center O3 of second roller 32 is displaced with respect to housing 11 in the direction away from first roller 31 due to extension of bearing support 23, 25. Accordingly, bearing support 23, 25 is prevented from extending toward the first roller side even with the stretching force acting on the rollers away from each other roller due to radial pressing contact between first roller 31 and second roller 32. In this way, the amount of extension of bearing support 23, 25 is not distributed to the first roller side and the second roller side.

Accordingly, the entire amount of extension of bearing support 23, 25 becomes identical to the amount of extension of bearing support 23, 25 toward the second roller side, and is concentrated to the second roller side. In this way, when second roller 32 is made to approach first roller 31 to increase the inter-roller radial pressing force (to increase the inter-roller transmitted torque capacity), it is possible to reduce the increase in the offset between front propeller shaft 7 and the rotation axis O2 of second roller 32 by the amount of extension of bearing support 23, 25 concentrated to the second roller side, and thereby enhance the durability of the driveline between second roller 32 and front propeller shaft 7.

The action and effect described above are detailed for a situation as shown in FIGS. 9A and 9B in which second roller 32 is made to move from a bottom dead center position shown in FIG. 9A radially to a top dead center position shown in FIG. 9B, to approach first roller 31, and thereby increase the inter-roller radial pressing force (inter-roller transmitted torque capacity). In this situation, as clearly shown in FIGS. 9A and 9B, the rotation axis O2 of second roller 32 approaches the rotation axis O1 of first roller 31, thereby increasing the offset between front propeller shaft 7 and the rotation axis O2 of second roller 32. The increase in the offset causes an increase in the relative radial displacement that is to be absorbed by the universal coupling between output shaft 13 and front propeller shaft 7, and thereby serves to adversely affect the durability of the driveline including the universal coupling.

On the other hand, when second roller 32 is made to approach first roller 31 radially to increase the inter-roller radial pressing force (inter-roller transmitted torque capacity) as described above, the reaction force increases, and causes a stretching force acting on the first roller 31 and second roller 32 away from each other, and thereby increases the amount of extension of bearing support 23, 25.

The increase in extension of bearing support 23, 25 serve to reduce the increase in the offset between front propeller shaft 7 and rotation axis O2 of second roller 32, and suppress the relative radial displacement that is to be absorbed by the universal coupling between output shaft 13 and front propeller shaft 7, and thereby enhance the durability of the driveline including the universal coupling.

In the present embodiment, the rotation axis O1 of first roller 31 is displaced with a displacement δ2 due to bending deformation of input shaft 12 which is described in detail below, but theoretically is not displaced by the extension of bearing support 23, 25, wherein only the revolution center O3 of second roller 32 is displaced with respect to housing 11 in the direction away from first roller 31 due to extension of bearing support 23, 25. Accordingly, bearing support 23, 25 is prevented from being extended toward the first roller side by the stretching force acting on the rollers away from each other roller due to radial pressing contact between first roller 31 and second roller 32, and is extended only toward the second roller side as indicated by arrow β2 in FIG. 9B, so that the amount of extension of bearing support 23, 25 is not divided between the first roller side and the second roller side. The entire extension of bearing support 23, 25 is identical to the extension of bearing support 23, 25 toward the second to roller side (β2=|α1|+|β1|) as indicated by arrow β2 in FIG. 9B, so that the entire extension of bearing support 23, 25 can be concentrated to the second roller side.

Accordingly, when second roller 32 is made to approach first roller 31 to increase the inter-roller radial pressing force (inter-roller transmitted torque capacity), displacement γ2 of revolution center O3 of the second roller due to extension of bearing support 23, 25 is larger as shown in FIG. 9B than γ1 in the conventional case of FIG. 8B, so that it is possible to sufficiently reduce the displacement ε2 of rotation axis O2 of the second roller by the amount of extension of bearing support 23, 25 concentrated to the second roller side as shown in FIG. 9B when the inter-roller transmitted torque capacity is increased. Accordingly, it is possible to take full advantage of the function of reducing the increase in the offset between front propeller shaft 7 and rotation axis O2 of second roller 32, and thereby enhancing the durability of the driveline between second roller 32 and front propeller shaft 7.

Moreover, the feature of this embodiment that each bearing support 23, 25 is provided with a projection 23c, 25c and a projection 23d, 25d, and each projection 23c, 25c and projection 23d, 25d is arranged in contact with a bottom surface of a guide groove 11g, 11h formed in the corresponding inner surface 11e, 11f of the housing for preventing the bearing support 23, 25 from swinging about axis O1 of input shaft 12 (first roller 31) as shown in FIG. 3, can produce the following action and effect.

Figure 10A:
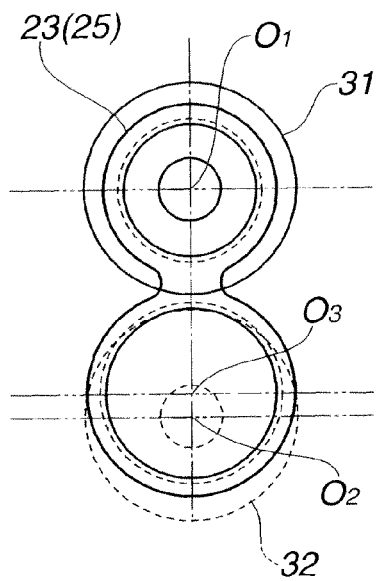
FIG. 10A is a diagram showing a situation in which the bearing support swings about a rotation axis of the first roller in the driving force distribution device of FIG. 7, specifically showing a condition before swinging of the bearing support.

In this regard, the following describes a problem confronting a case in which bearing support 23, 25 includes no projection 23c, 25c and no projection 23d, 25d, and is not prevented from swinging about the axis O1. When second roller 32 is made to revolve about the eccentric axis O3 from a position out of contact with first roller 31 as shown in FIG. 10A to a position in contact with first roller 31 as shown in FIG. 10B, bearing support 23, 25 is applied with a turning moment about the axis O1 of the first roller, and is made to swing about the axis O1 of the first roller from the position shown in FIG. 10A to the position shown in FIG. 10B.

Figure 10B:
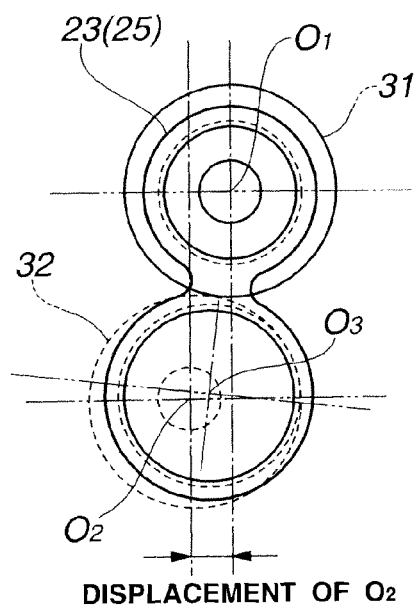
FIG. 10B is a diagram showing the situation in which the bearing support swings about the rotation axis of the first roller in the driving force distribution device of FIG. 7, specifically showing a condition after swinging of the bearing support.

In the case in which bearing support 23, 25 includes no projection 23c, 25c and no projection 23d, 25d for preventing the swinging motion in contrast to the present embodiment, the swinging motion of bearing support 23, 25 is large so that the displacement of rotation axis O2 of second roller 32 becomes large by addition of a displacement resulting from this swinging motion, as shown in FIG. 10B. This displacement of rotation axis O2 of the second roller relates to the offset between front propeller shaft 7 and the rotation axis O2 of the second roller, so that the offset between front propeller shaft 7 and the rotation axis O2 of the second roller is increased.

The increase in the offset between front propeller shaft 7 and the rotation axis O2 of the second roller becomes large causes an increase in the relative radial displacement to be absorbed by the universal coupling between output shaft 13 and front propeller shaft 7, and thereby causes a problem that the durability of the driveline including the universal coupling is adversely affected.

Figure 11A:
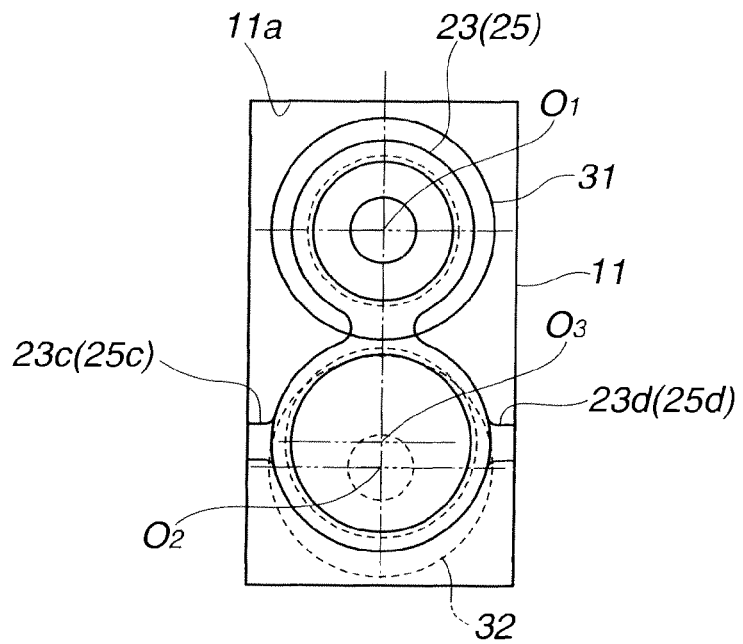
FIG. 11A is a diagram showing a situation in which the bearing support swings about a rotation axis of the first roller in the driving force distribution device of FIG. 2, specifically showing a condition before swinging of the bearing support.
Figure 11B:
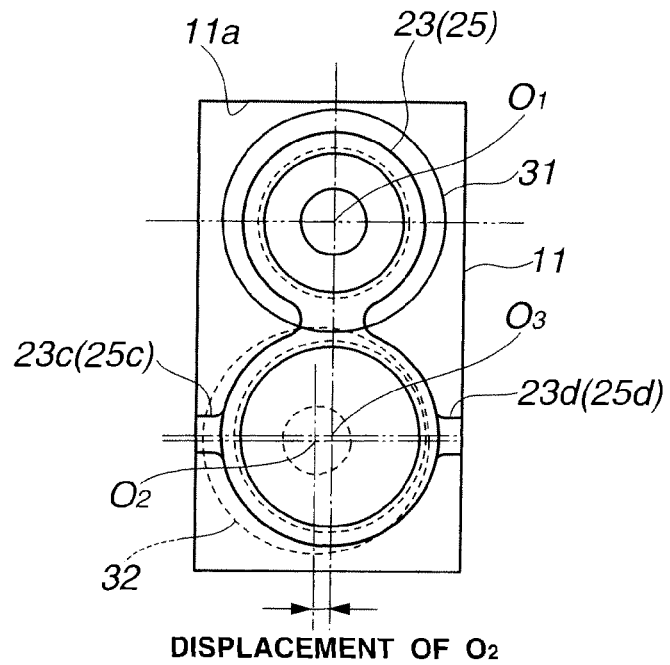
FIG. 11B is a diagram showing the situation in which the bearing support swings about the rotation axis of the first roller in the driving force distribution device of FIG. 2, specifically showing a condition after swinging of the bearing support.

In contrast, in the present embodiment in which bearing support 23, 25 is provided with projection 23c, 25c and projection 23d, 25d for preventing bearing support 23, 25 from swinging about the axis O1 of input shaft 12 (first roller 31), bearing support 23, 25 is prevented from swinging about the axis O1 of the first roller, as clearly shown in FIG. 11B, even when second roller 32 is made to revolve about the eccentric axis O3 from a position out of contact with first roller 31 as shown in FIG. 11A to a position in contact with first roller 31 as shown in FIG. 11B, and thereby bearing support 23, 25 is applied with a turning moment about the axis O1 of the first roller.

Accordingly, the displacement of rotation axis O2 of second roller 32 can be held small as shown in FIG. 11B, because no displacement resulting from this swinging motion of bearing support 23, 25 is added to the displacement of rotation axis O2 of second roller 32. Since this displacement of rotation axis O2 of the second roller relates to the offset between front propeller shaft 7 and the rotation axis O2 of the second roller, it is possible to hold small the offset between front propeller shaft 7 and the rotation axis O2 of the second roller.

The reduction in the offset between front propeller shaft 7 and the rotation axis O2 of the second roller leads to a reduction in the relative radial displacement to be absorbed by the universal coupling between output shaft 13 and front propeller shaft 7, and thereby serves to solve the problem described above with reference to FIGS. 10A and 10B that the durability of the driveline including the universal coupling is adversely affected.

According to the present embodiment, it is possible to achieve the foregoing action and effect with a simple and inexpensive construction in which bearing support 23, 25 is provided with projection 23c, 25c and projection 23d, 25d to prevent bearing support 23, 25 from swinging about the axis O1 of input shaft 12 (first roller 31). Moreover, it is possible to reliably achieve the action and effect described above with reference to FIG. 9, because projection 23c, 25c and projection 23d, 25d are configured to be capable of sliding in guide groove 11g, 11h of inner surface 11e, 11f of the housing in the vertical direction as shown in FIG. 3 so that the large extension (32 of bearing support 23, 25 toward the second roller side is not prevented.

Second Embodiment

FIGS. 5 and 6 show the second embodiment of the present invention. This embodiment is configured to solve a problem that bending deformation of input shaft 12 causes a radial displacement of first roller 31 as indicated by δ2 in FIG. 9B in the first embodiment of FIGS. 1 to 4, and thereby affect adversely, although slightly, the action and effect of the first embodiment.

Figure 12A:
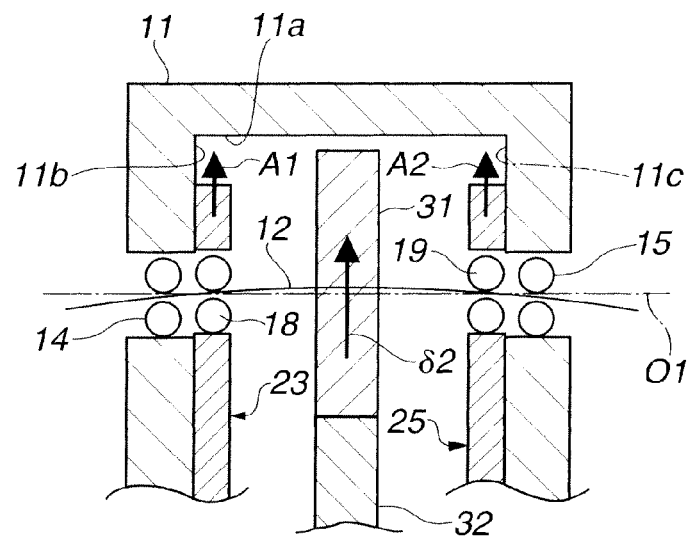
FIG. 12A is a diagram showing how an input shaft is deformed by an inter-roller radial pressing force in the first embodiment of FIGS. 1 to 4.

First, the following describes the radial displacement δ2 of first roller 31 resulting from bending deformation of input shaft 12 in the first embodiment, with reference to FIG. 12A. The radial pressing force between first roller 31 and second roller 32 acts on input shaft 12 through first roller 31, and thereby serves to cause bending deformation of input shaft 12 between ball bearings 14, 15 which serves as bearings to support input shaft 12 with respect to housing 11.

In the first embodiment, there is a clearance between bearing support 23, 25 and inner wall 11a of housing 11 so that bearing support 23, 25 can move in the direction indicated by arrow A1, A2 toward the inner wall 11a, and therefore cannot resist the inter-roller radial pressing force to cause bending deformation of input shaft 12 between ball bearings 14, 15 as described above. Accordingly, bending deformation of input shaft 12 is caused as shown in FIG. 12A, so that first roller 31 is displaced in the radial direction toward the inner wall 11a of the housing by δ2 due to the bending deformation.

The radial displacement δ2 of first roller 31 results in a decrease in the displacement δ2 of revolution center O3 of the second roller in FIG. 9B, and thereby increases the displacement ϵ2 of the rotation axis O2 of the second roller, and thereby affect adversely, although slightly, the action and effect of the first embodiment.

In order to solve this problem, in this embodiment, an end portion of bearing support 23, 25 facing the housing inner wall 11a is provided with a projection 23e, 25e in contact with housing inner wall 11a, although driving force distribution device 1 is configured basically similar to the first embodiment shown in FIGS. 1 to 4, as shown in FIGS. 5 and 6.

Figure 12B:
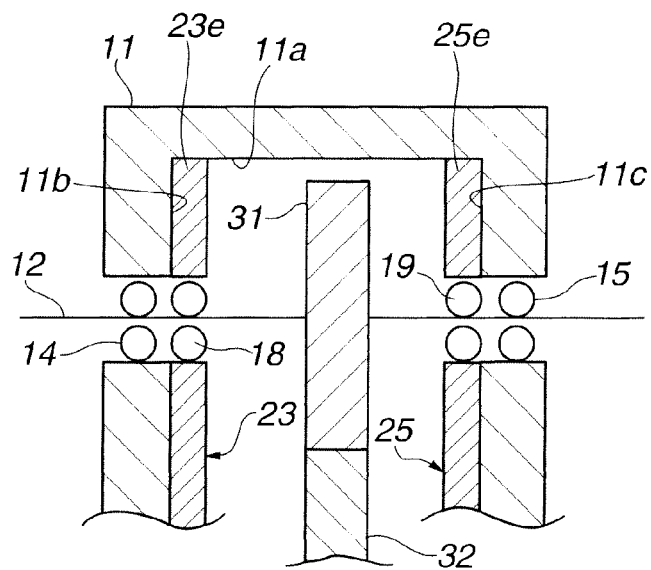
FIG. 12B is a diagram showing how an input shaft is deformed by an inter-roller radial pressing force in the second embodiment of FIGS. 5 and 6.

As shown in FIG. 12B, projection 23e, 25e prevents bearing support 23, 25 from moving in the direction indicated by arrow A1 or A2 in FIG. 12A by contact with inner wall 11a, and thereby prevents input shaft 12 from being bended between ball bearings 14, 15 by the inter-roller radial pressing force. Accordingly, as shown in FIG. 12B, input shaft 12 is maintained straight substantially without bending deformation due to the inter-roller radial pressing force, so that first roller 31 is prevented from radial displacement indicated by δ2 in FIG. 12A.

Accordingly, in a situation as shown in FIGS. 13A and 13B in which second roller 32 is made to approach first roller 31 radially from a bottom dead center position shown in FIG. 13A to a top dead center position shown in FIG. 13B, and thereby increase the inter-roller radial pressing force (inter-roller transmitted torque capacity) under the same condition as in FIGS. 9A and 9B, the feature of this embodiment that the radial displacement δ2 of first roller 31 due to bending deformation of input shaft 12 is substantially equal to zero serves to make the displacement γ3 of revolution center O3 of the second roller larger than γ2 in FIG. 9B, as shown in FIG. 13B, and thereby make the displacement ϵ3 of rotation axis O2 of the second roller smaller than ϵ2 in FIG. 9B. This makes further remarkable the action and effect of the first embodiment.

In this connection, projection 23e, 25e of this embodiment further functions by contact with housing inner wall 11a to concentrate to the second roller side the extension of bearing support 23, 25 when the inter-roller radial pressing force (inter-roller transmitted torque capacity) is increased. This provides an additional advantage of making further remarkable the action and effect of the first embodiment.

Other Embodiment

The first and second embodiments are described above with reference to cases as shown in FIGS. 2 and 5 where second roller 32 is rotatably supported by eccentric holes 52La, 52Ra of crankshafts 52L, 52R that are rotatably supported about eccentric axis O3, and crankshafts 52L, 52R are rotated so that second roller 32 revolves from a non-transmission position out of contact with first roller 31 to a transmission position in pressing contact with first roller 31. Alternatively, the concept of the present invention can be applied to a driving force distribution device not shown in which second roller 32 is rotatably supported about an eccentric shaft portion of a crankshaft that is rotatably supported about eccentric axis O3, and the crankshaft is made to revolve so that second roller 32 revolves from the non-transmission position out of contact with first roller 31 to the transmission position in pressing contact with first roller 31. This achieves a similar action and effect naturally.

The invention claimed is:

1. A friction gearing comprising:
a housing; and
a unit housed in the housing, wherein the unit includes a first roller, a second roller, at least one hollow crankshaft, and a rotation support plate;
wherein:
the first and second rollers are configured to perform frictional transmission in radial pressing contact with each other,
a state of the radial pressing contact between the first and second rollers is variable by radial displacement of the second roller with respect to the first roller,
the rotation support plate is configured to support the first and second rollers, and receive a reaction force caused by the radial pressing contact between the first and second rollers,
the rotation support plate includes:
a first part supporting the first roller, and
a second part supporting the second roller via the at least one hollow crankshaft,
the at least one hollow crankshaft is rotatable with respect to the rotation support plate about a first rotation axis,
the second roller is rotatable with respect to the at least one hollow crankshaft about a second rotation axis that is eccentric with respect to the first rotation axis, and
the unit is supported in the housing such that the first part of the rotation support plate is fixed with respect to the housing, and the second part of the rotation support plate is displaceable with respect to the housing in a substantially radial direction between the first roller and the second roller.

2. The friction gearing as claimed in claim 1, wherein the rotation support plate is arranged in contact with a portion of an inner wall of the housing, wherein the first roller is located between the portion of the inner wall of the housing and the second roller.

3. The friction gearing as claimed in claim 1, wherein the rotation support plate is arranged in the housing in a manner to restrain swinging motion of the rotation support plate about a rotation axis of the first roller.

4. The friction gearing as claimed in claim 3, wherein the rotation support plate includes a projection that projects so as to contact an inner wall of the housing in a manner to prevent swinging motion of the rotation support plate about the rotation axis of the first roller.

5. The friction gearing as claimed in claim 1, wherein the housing includes a guide groove configured to guide the displacement of the second part of the rotation support plate.

6. A friction gearing comprising:
a housing; and
a unit housed in the housing, wherein the unit includes a first roller, a second roller, at least one hollow crankshaft, and a rotation support plate;
wherein:
the first and second rollers are configured to perform frictional transmission in radial pressing contact with each other,
a state of the radial pressing contact between the first and second rollers is variable by radial displacement of the second roller with respect to the first roller,
the rotation support plate is configured to:
support the first roller,
support the second roller via the at least one hollow crankshaft, and
receive a reaction force caused by the radial pressing contact between the first and second rollers,
the at least one hollow crankshaft is rotatable with respect to the rotation support plate about a first rotation axis,
the second roller is rotatable with respect to the at least one hollow crankshaft about a second rotation axis that is eccentric with respect to the first rotation axis,
the unit is supported in the housing such that the first roller is restrained from being displaced by extension of the rotation support plate due to the reaction force with respect to the housing in a direction away from the second roller, and
the second roller is configured to be displaced with respect to the housing in a direction away from the first roller by extension of the rotation support plate due to the reaction force.

* * * * *